June 7, 1949.    J. J. DILLON ET AL    2,472,523
BACKING OR CHILL RING
Filed May 24, 1945
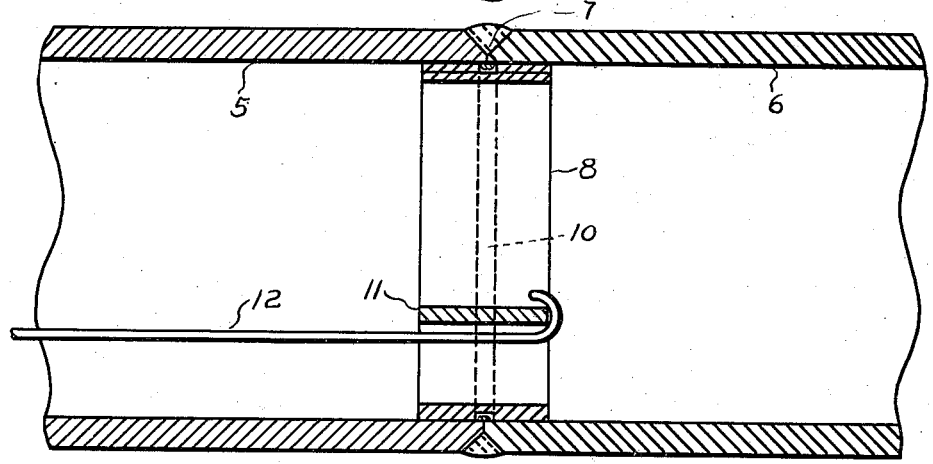
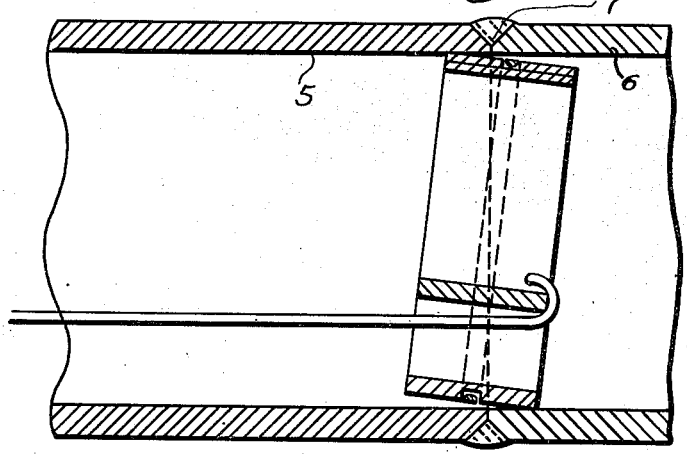
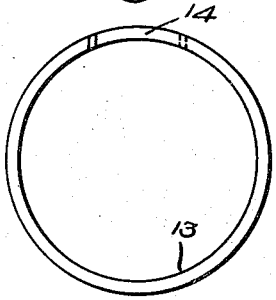
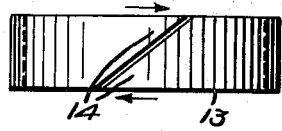
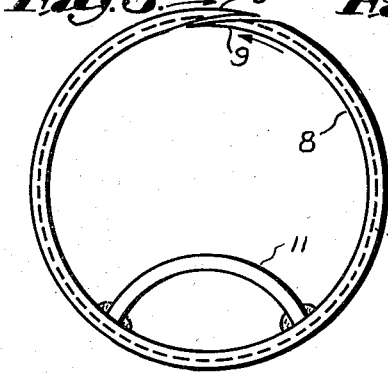
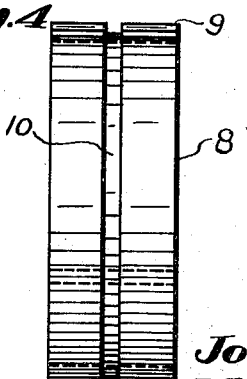
Inventors:
John J. Dillon,
Michael Needle,
by Spear & Spear
Attorneys Patented June 7, 1949

2,472,523

UNITED STATES PATENT OFFICE 2,472,523

BACKING OR CHILL RING

John J. Dillon, Needham, and Michael Needle, Chelsea, Mass.

Application May 24, 1945, Serial No. 595,594

2 Claims. (Cl. 113—111)

Our present invention relates to backing or chill rings for use in the welding of pipe or like hollow sections.

When pipe sections are welded together, an objectionable consequence is the formation of "icicles" protruding into the interior of the pipe along the line of the weld. These "icicles" are particles of metal and slag and are particularly objectionable in high pressure pipe lines as they not only interfere with the flow of pipe line contents, but also because they may become dislodged and carried thereby into a turbine, for example, and cause substantial damage.

This difficulty has long been recognized and, as a result, backing or chill rings have been widely used. Such rings were inserted into the end of one section to extend into the adjacent end of another section when the sections were butted together to be welded. As such rings provided a backing along the line of the weld, the formation of "icicles" was avoided but their use was unsatisfactory because of the difficulty of removing them when the welding operation was otherwise completed. Such rings were commonly themselves of weldable stock and, in any event unless only a short section was welded to the line, the rings were not accessible through the pipe and could not be removed at all so that they remained as obstructions in the pipe line and at some future time would disintegrate and pass on through the pipe line in small particles, causing trouble to valves, pumps, turbines or where the pipe line terminates.

In accordance with our invention, we provide backing or chill rings formed from non-weldable, yieldable stock having overlapped ends. Any stock may be used to make our rings that provides a ring capable of being seated to protrude from one section and remain in that position when the two sections to be welded are brought into a butted relation to provide a backing along the line of the weld. At the same time, the stock must be yieldable to permit the ring to be deformed and withdrawn through the pipe by a chain or other suitable means extending through one of the sections and connected to the ring. By this construction, we are able to provide a chill ring that is effective to prevent the formation of icicles when the sections are welded together and that may be easily withdrawn through even a long pipe section.

In the accompanying drawings, we have shown an illustrative embodiment of our invention from which its novel features and advantages will be readily apparent.

In the drawings:

Fig. 1 is a partly sectioned view showing a ring in accordance with our invention positioned to facilitate the welding of two pipe sections.

Fig. 2 shows, in a similar view, the ring of Fig. 1 being withdrawn through one of the pipe sections.

Fig. 3 is an end view of the ring of Fig. 1.

Fig. 4 shows the ring in elevation.

Fig. 5 is an end view of a modification of our invention, and

Fig. 6 shows the ring of Fig. 5 in elevation.

At 5 and 6, we have shown pipe sections butted together for welding along the line 7 with the ring 8 establishing interior backing for that line.

The ring 8 is of non-weldable, yieldable stock. While copper is entirely satisfactory, we may make our rings from other non-weldable metals, plastics, or materials coated to render them suitable for backing on chill rings.

The ring 8 is formed to fit securely within one end of one of the pipe sections in a position to enter the adjacent end of the other pipe section as the sections 5 and 6 are butted together for welding. The ring 8 has tapered and radially overlapped ends 9 and may also have a groove 10 adapted to be disposed in registry with the weld line 7. While we have shown the ring 8 as having a loop 11 disposed diametrically opposite to its overlapped ends 9, the loop may, of course, be in any position in the ring where a pull on it facilitates deformation of the ring.

In Figs. 5 and 6, we have shown a modification of our invention in which the ends of the strip from which the ring 13 is formed are diagonal establishing complementary tapered laterally overlapping terminals 14.

The stock from which our rings are made must be sufficiently stiff to remain in position to back the line of weld as the sections are brought together for welding. The stock must also be sufficiently yieldable to deform and to permit relative movement between the overlapped ends of the ring in the direction of the arrows (Figs. 3 and 6) when the withdrawing means 12 are pulled to permit the ring 8 to be removed through the pipe.

Our invention accordingly provides backing rings that are not only effective to prevent the formation of "icicles" but also adapted to be easily removed through the pipe after the sections have been welded together.

What we therefore claim and desire to secure by Letters Patent is:

1. A backing ring for interior engagement with adjacent end portions of pipe or like hollow sections of weldable stock when said sections are butted together for welding, and to be withdrawn through one of the sections by means engageable with the ring and extending through one of the sections, said ring comprising a strip of nonweldable yieldable stock the ends of which are tapered and overlapped, said strip being sufficiently stiff to remain in a seated position protruding from one section when the other section is butted thereagainst while yielding, when pulled, to permit it to be tipped with one overlapping end sliding relative to the other so that it may be withdrawn through the pipe after the sections have been welded together, and rigid means carried by said strip and so located as to arcuately brace said ring remote from its overlapped ends for engagement by said withdrawing means and so disposed that the ring is tipped when the withdrawing means are pulled.

2. The ring of claim 1, in which the means on the strip comprises a loop disposed substantially opposite to its overlapped ends.

JOHN J. DILLON.
MICHAEL NEEDLE.

REFERENCES CITED

The following references are of record in the file of this patent:

UNITED STATES PATENTS

| Number | Name | Date |
| --- | --- | --- |
| 1,901,634 | Dawkins | Mar. 14, 1933 |
| 1,939,772 | Greene | Dec. 19, 1933 |
| 1,980,419 | Martin et al. | Nov. 13, 1934 |
| 1,987,341 | Kachel | Jan. 8, 1935 |
| 2,321,308 | Miller | June 8, 1943 |